United States Patent
Thomas et al.

(10) Patent No.: US 6,198,248 B1
(45) Date of Patent: Mar. 6, 2001

(54) METHOD OF CONTROLLING A ROTARY ELECTRICAL MACHINE, A SERVO-CONTROL SYSTEM FOR IMPLEMENTING THE METHOD, AND A ROTARY MACHINE FITTED WITH SUCH A SYSTEM

(75) Inventors: Jean-Luc Thomas, Fontainebleau; Vincent Dionnet, Le Mans; Serge Poullain, Arpajon, all of (FR)

(73) Assignee: Alstom Enterprise SA, Levallois Perret (FR)

( * ) Notice: Subject to any disclaimer, the term of this patent is extended or adjusted under 35 U.S.C. 154(b) by 0 days.

(21) Appl. No.: 09/433,287

(22) Filed: Nov. 3, 1999

(30) Foreign Application Priority Data

Nov. 4, 1998 (FR) .................................................. 98 13848

(51) Int. Cl.$^7$ ..................................................... H02P 7/63

(52) U.S. Cl. .................... 318/800; 318/801; 318/430; 388/907.5; 388/909

(58) Field of Search ................................. 318/430, 431, 318/798, 799, 800, 801; 388/907, 907.5, 909

(56) References Cited

U.S. PATENT DOCUMENTS

| | | | |
|---|---|---|---|
| 4,707,651 | * 11/1987 | Schauder | 318/800 |
| 5,777,452 | * 7/1998 | Thomas | 318/809 |
| 5,973,474 | * 10/1999 | Yamamoto | 318/801 |
| 6,008,618 | * 12/1999 | Bose et al. | 318/811 |
| 6,014,006 | * 1/2000 | Stuntz et al. | 318/804 |
| 6,137,258 | * 10/2000 | Jansen | 318/802 |

FOREIGN PATENT DOCUMENTS 0 858 155   8/1998  (EP) .

OTHER PUBLICATIONS

L. Yongdong et al, "Direct Torque Control of Induction Motor for Low Speed Drives Considering Discrete Effects of Control and Dead–Time Inverter", IAS '97, CONFERENCE RECORD OF THE 1997 IEEE INDUSTRY APPLICATIONS CONFERENCE 32$^{ND}$, IAS Annual Meeting, New Orleans, LA Oct. 5–9, 1997, vol. 1, pp. 781–788, Institute of Electrical and Electronics Engineers XP000775232ISBN R. Jobing et al, "Digital Implementation of Bus Clamped Space Vector Modulation" IEEE TRANSACTIONS ON ENERGY CONVERSION, vol. 9, No. 2 a Jun. 1994 (06–01–1994) pp. 344–348 XP000458873

* cited by examiner

*Primary Examiner*—Bentsu Ro
(74) *Attorney, Agent, or Firm*—Sughrue, Mion, Zinn, Macpeak & Seas, PLLC

(57) ABSTRACT

A method of controlling the torque of a rotary machine powered by means of an inverter and servo-controlled by a system having sensors, an observer, and a computer which delivers controls to the switches of the inverter on the basis of values supplied to the observer by the sensors, in the form of sequences of three vectors to bring the torque $\Gamma$ and the stator flux $\Phi_S$ of the machine towards reference values for $\Gamma_{ref}$ and $\Phi_{Sref}$. The measurement sampling period is selected to be equal to the sequence period DTML which corresponds to half the switching period of the inverter. The characteristics of the vectors for each sequence are obtained by solving the following system of equations:

$$\begin{cases} \dfrac{d\Gamma}{dt_a}t_a + \dfrac{d\Gamma}{dt_p}t_p = \Gamma_{ref} - \Gamma_n \\ t_a + t_p = DTML \end{cases}$$

in which $d\Gamma/dt_a$ and $d\Gamma/dt_p$ are variations over time in torque respectively when an active vector $V_a$ or a passive vector $V_p$ is applied, $\Gamma_n$ being the present torque, and $t_a$ and $t_p$ are the respective times during which the vectors are applied.

4 Claims, 3 Drawing Sheets

US 6,198,248 B1

METHOD OF CONTROLLING A ROTARY ELECTRICAL MACHINE, A SERVO-CONTROL SYSTEM FOR IMPLEMENTING THE METHOD, AND A ROTARY MACHINE FITTED WITH SUCH A SYSTEM

The invention relates to a method of controlling a rotary machine, to a servo-control system for implementing the method, and to a rotary machine fitted with such a servo-control system.

BACKGROUND OF THE INVENTION

The electrical power supplied by a multiphase AC source to the stator windings of an asynchronous rotary machine serves to magnetize the machine by generating both stator flux $\Phi_S$ and rotor flux $\Phi_R$ therein, and more particularly it serves to create electromagnetic torque $\Gamma$ therein.

With asynchronous rotary machines it is conventional to make use of stator flux control since that makes it possible in particular to keep a machine in motor operation within the limits within which its electromagnetic state is the best possible, consequently giving rise to the highest efficiency in terms of converting received electrical energy into mechanical energy.

Naturally, it is essential to have full control over torque output for a machine that is operating as a motor.

In conventional manner, the Concordia transform makes it possible by means of two independent components $V_{S\alpha}$ and $V_{S\beta}$ to define the power supply voltage $V_S$ applied to the stator of a three-phase motor in which neutral is not distributed.

A known control method is described in particular in document EP-A-0812059. It relates to an n-phase rotary machine powered by means of a voltage inverter having n switches with m states, and known as a single-pole m-logic level (SPmLL) machine, that enables $m^n$ distinct output states to be obtained, and thus in the present case makes it possible to obtain $m^n$ distinct stator power supply voltages for the machine, each of said voltages being conventionally represented by a vector at a given instant. A servo-control system is implemented so that the multi-state switches change state in such a manner as to define a power supply vector that is optimum at all times and so as to bring the torque $\Gamma$ and the stator flux $\Phi_S$ of the machine towards the reference torque and the reference flux as already defined. That servo-control system has a set of sensors, an observer, and a computer. The computer controls selection of the optimum power supply vector by acting selectively on the switches. The rotation of the stator power supply voltage vector $V_S$ of a machine in operation gives rise to the selection being varied over time. Thus, for a three-phase inverter including a two-state switch, i.e. two logic states per phase, selection is performed amongst eight vectors corresponding to the $2^3$ logical combinations (or output states) of the inverter, which are shown diagrammatically in FIG. 1, two of them being of zero amplitude and corresponding to the cases of all of the switches being open or all of the switches being closed, in conventional manner.

As a consequence of the above, the working space in which the methods of document EP-A-0812059 and of the invention are implemented, is the ($\Phi_{S\alpha}$, $\Phi_{S\beta}$, $\Gamma$) domain which can be subdivided into two sub-spaces, one of which is constituted by the ($\Phi_{S\alpha}$, $\Phi_{S\beta}$) plane and the other by variation over time in the torque ($\Gamma$, t).

The purpose of the servo-control is to achieve direct control over the torque $\Gamma$ and over the stator flux amplitude $|\Phi_S|$ as a function of reference values for flux and torque given respectively by $|\Phi_S|_{ref}$ and $\Gamma_{ref}$. These references can be translated into the ($\Phi_{S\alpha}$, $\Phi_{S\beta}$, $\Gamma$) domain in a geometrical form as shown diagrammatically in FIG. 2 where there is shown a three-dimensional frame of reference having a vertical axis which is assumed to be graduated in torque values $\Gamma$, and two horizontal axes $\Phi_{S\alpha}$ and $\Phi_{S\beta}$ which are graduated in flux values.

The path of the reference flux $\Phi_{Sref}$ corresponds to a rotating field, and the vertical cylinder centered on the torque axis $\Gamma$ on the frame of reference represents the reference flux:

the reference torque in this case is assumed to be located on the horizontal reference plane ($\Phi_{S\alpha}$, $\Phi_{S\beta}$) associated with the torque value graduation on the vertical axis corresponding to the torque $\Gamma_{ref}$; and the horizontal circle where the horizontal plane at altitude $\Gamma_{ref}$ intersects the cylinder corresponds to the reference ($|\Phi_S|_{ref}$, $\Gamma_{ref}$).

The purpose of servo-control is to reproduce the trajectory defined by this circle of intersection by controlling the inverter appropriately, making best use of the means constituted by the switches, while keeping as close as possible to the reference torque value. It is not possible to follow the ideal trajectory in three dimensions accurately insofar as the number of different output voltage vectors which an inverter can produce is limited.

Thus, starting from a point A that is representative of a current state corresponding to a flux level and to a torque level at a given instant in the operation of a machine, as shown in FIG. 2, the purpose of the control system is to control the inverter in such a manner as to attempt to reach a point such a D which is situated on the circle of intersection, and to do so within a determined time interval, for example equal to $1/(2f_d)$, where $f_d$ is the chopper frequency of the inverter.

Because of the small number of output voltage vectors available from an inverter, it is necessary to implement a plurality of different commands during a single time interval in order to obtain the above-indicated results, as represented in FIG. 2 by the three vectors AB, BC, CD, each of which corresponds to an output voltage of the inverter, and thus from the stator power supply $V_S$.

The computer in the servo-control system makes use of an algorithm that makes it possible to select an optimum sequence for controlling the inverter during each of the successive time intervals subdividing the operating time of the machine, on the basis of values supplied by the servo-control system sensors and reference values concerning flux and torque.

In particular, provision is made in the above-mentioned European document, for each sequence to extend over a time interval equal to $1/(2f_d)$ and to comprise three distinct inverter commands which are implemented in succession and each of which corresponds to a different stator voltage vector $V_S$. The first two commands are active and cause the motor torque to vary in a manner that corresponds to acceleration or deceleration of the rotating vector corresponding to the stator flux $\Phi_S$ relative to the rotating vector corresponding to the rotor flux $\Phi_R$, while the third command is passive and allows the torque to reduce, corresponding to the stator flux vector catching up the rotor flux vector.

The search performed during each time interval for the optimum sequence seeks to determine the sole triplet of commands having respective positive durations that make it possible to reach a point on the above-mentioned circle of intersection within the available time interval. This search for an optimum sequence can be unsuccessful in the event of large transients, in which case a more suitable strategy is used, as described in detail in the above-mentioned European document EP-A-0812059.

In conventional manner, the calculation required for determining the command triplets, and more particularly the durations during which each command stage should be implemented, are themselves complex and require expensive investment in software and hardware.

At the beginning of each cycle of seeking an optimum sequence, the algorithm used by the computer selects the sole triplet of commands having positive duration that makes it possible to reach the circle of intersection at the end of a time interval $1/(2f_d)$.

In a first step corresponding to the vector AB in FIGS. 2 to 4, it is necessary to perform calculation for the point A and for all current points A' following A along the vector AB and corresponding to successive samples. These calculations seek to determine the remaining conduction times $dt_1$, $dt_2$, and $dt_3$ for application of each of the three commands provided in the sequence on the basis of the following equations, where t is current time:

$$dt_1 + dt_2 + dt_3 = 1/(2f_d) - t$$

$$\Gamma/(2f_d) = \Gamma_{ref}$$

$$\Phi_S^2/(2f_d) = \Phi_{Sref}^2$$

This system of three equations in three unknowns is linearized about the operating point, and since the equation of a cylinder is quadratic, it is possible to replace the cylinder target D as shown in FIG. 2 by a plane target that is tangential to the current arrival point D'.

The resulting equation 1 is written as follows:

$$\begin{bmatrix} \frac{d\Phi_{Sa}}{dt}(2) & \frac{d\Phi_{Sa}}{dt}(3) & \frac{d\Phi_{Sa}}{dt}(1) & \Phi_{S\beta}(D') \\ \frac{d\Phi_{S\beta}}{dt}(2) & \frac{d\Phi_{S\beta}}{dt}(3) & \frac{d\Phi_{S\beta}}{dt}(1) & -\Phi_{Sa}(D') \\ \frac{d\Gamma}{dt}(2) & \frac{d\Gamma}{dt}(3) & \frac{d\Gamma}{dt}(1) & 0 \\ 1 & 1 & 1 & 0 \end{bmatrix} \cdot \begin{bmatrix} dt_2 \\ dt_3 \\ dt_1 \\ \lambda \end{bmatrix} = \begin{bmatrix} \Phi_{Sa}(D) - \Phi_{Sa}(A') \\ \Phi_{S\beta}(D) - \Phi_{S\beta}(A') \\ \Gamma(D) - \Gamma(A') \\ \frac{1}{2 \cdot f_d} - t \end{bmatrix}$$

it provides the three durations of application for an optimum sequence, plus the parameter $\lambda$ which defines the end point D of a sequence on the tangent to the circle of intersection. When calculation gives a value for $dt_2$ that is less than the sampling period T, the instant at which switchover occurs from the first step to the second step can take place, with said instant corresponding to point B in FIGS. 2 to 4.

In a second active command stage, corresponding to vector BC in FIGS. 2 to 4, above equation 1 needs to be solved taking account of the fact that $dt_2=0$, and unfortunately there is no exact solution for $dt_3$. It is therefore necessary to use an approximate solution which minimizes error, said solution being assumed in this case to be obtained by applying the method of least squares. Equation 2 which is derived from equation 1 and taking the above-indicated elements into account serves to determine the duration $dt_3$ of this second stage and as a consequence the duration $dt_1$ of the last of the three stages of the sequence under consideration, and also a new value for $\lambda$.

When calculation gives $dt_3$ a value that is less than the sampling period T, the instant at which the second stage switches to the third can be determined, with this instant corresponding to point C in FIGS. 2 to 4.

In a third or passive command stage, corresponding to vector CD, equation 2 as obtained from equation 1 needs to be solved while taking account of the fact that $dt_3=0$. That equation likewise does not give an exact solution and the least squares method is again used to provide an approximate solution.

Implementing the calculations required to operate a machine controlled by a servo-control system that implements the stages summarized above and for each of the optimized command sequences that are required in succession, implies implementing software and hardware means that, at present, can only be envisaged using machines that are themselves very expensive, such as very high power machines that are unsuitable for controlling more ordinary machines.

OBJECTS AND SUMMARY OF THE INVENTION

To remedy that drawback, the invention thus proposes a method of controlling the electromagnetic torque of a rotary machine having n phases powered via an inverter having n switches each having m states, thereby defining $m^n$ states for a stator voltage vector $V_i$, where $i \in \{1, \ldots, m^n\}$, the machine being servo-controlled in terms of electromagnetic torque $\Gamma$ and stator flux $\Phi_S$ to a reference electromagnetic torque $\Gamma_{ref}$ and a reference stator flux $\Phi_{Sref}$ by means of a servo-control system comprising a set of sensors, an observer, and a computer, the computer delivering control signals to the multi-state switches of the inverter in successive sequences of three successive commands, on the basis of values supplied to the observer by the sensors, the computer determining for each sequence, amongst the $V_i$ possible states of the stator voltage vector, the three command vectors to be used in succession so as to bring the torque $\Gamma$ and the stator flux $\Phi_S$ optimally towards the reference torque $\Gamma_{ref}$ and the reference flux $\Phi_{Sref}$ and to command the multi-state switches accordingly.

According to a characteristic of the invention, in a system where the sampling period for measuring purposes is selected to be equal to a period DTML specific to the sequences of three successive commands, which period is itself equal to half the switching period of the inverter, the instants and the durations for which the vectors of each sequence are obtained by solving the following system of equations:

$$\begin{cases} \frac{d\Gamma}{dt_a}t_a + \frac{d\Gamma}{dt_p}t_p = \Gamma_{ref} - \Gamma_n \\ t_a + t_p = DTML \end{cases}$$

in which: $d\Gamma/dt_a$ corresponds to variation in time of the torque while an active vector $V_a$ is being applied; $d\Gamma/dt_p$ corresponds to variation in time of the torque while a passive vector $V_p$ is being applied; $\Gamma_{ref}$ is the reference torque; $\Gamma_n$ is the present torque, and $t_a$ and $t_p$ are the times during which the active and passive vectors are respectively applied.

This makes it possible in particular to implement an inverter command strategy in which the distribution of the command vectors makes it possible to make the command orders given to the switches of the inverter symmetrical, thereby leading to a torque harmonic content that leads to minimizing torque impulses on the shaft of the machine.

BRIEF DESCRIPTION OF THE DRAWINGS

The invention, its characteristics, and advantages, are described in greater detail in the following description given with reference to the figures listed below, in which the first five figures relate to the prior art.

MORE DETAILED DESCRIPTION

Figure 5:
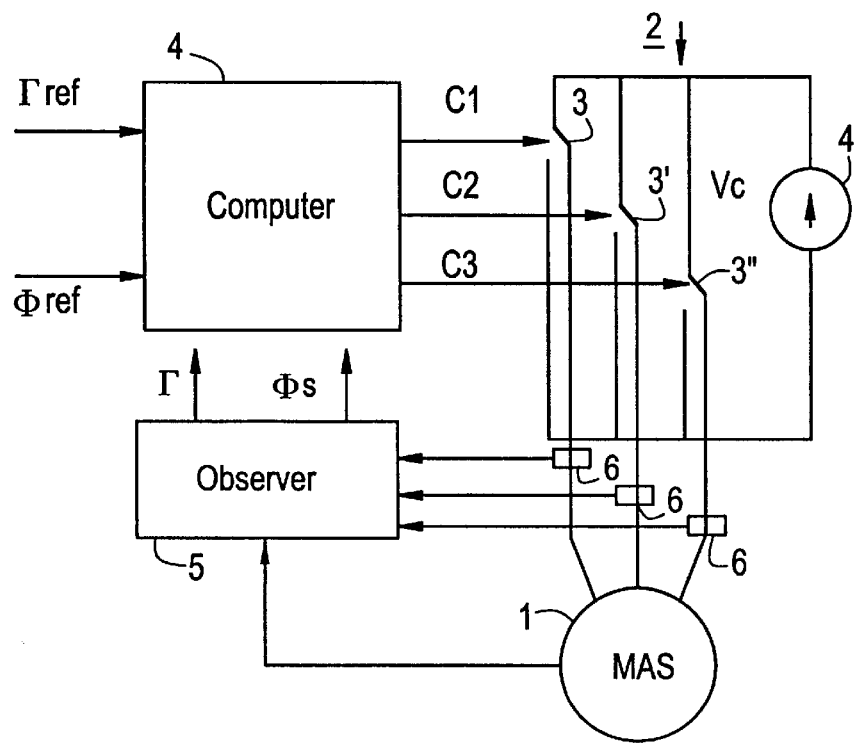
FIG. 5 is a block diagram of a rotary machine fitted with a servo-control system.

The command method of the invention is designed to be implemented to control the torque of a rotary machine in the context of an assembly of the kind shown diagrammatically in FIG. 5. The assembly comprises a rotary machine 1 having n phases fed with AC by a voltage inverter 2 having n switches of m states each, and thus defining $m^n$ states for the output voltage vector $V_S$, FIG. 5 showing three switches 3, 3', 3" each having two states.

A servo-control system provides selective and coordinated control of each of the switches by means of signals referenced C1, C2, and C3. These signals are established by means of a computer 4 that is appropriately programmed and which has received indications concerning the reference torque $\Gamma_{ref}$ and the reference flux $\Phi_{ref}$. The servo-control system also has an observer 5 which deduces the instantaneous values of the electromechanical torque $\Gamma$ and of the stator flux $\Phi_S$ from measurements performed by a set of sensors 6 on the electrical power supply links to the machine. The structures of the various members mentioned above are not developed herein, given that the subject matter of the invention does not relate directly to them and they are known to the person skilled in the art.

The control method of the invention makes use of the model described above with reference to FIGS. 1 to 4 for predicting switching times, but does so by exploiting a technique which makes it possible to greatly limit the amount of calculation compared with the prior art mentioned in the introduction to the present application. The method makes it possible to provide a torque control servo-control loop that takes account of constraints relating to flux.

Figure 2:
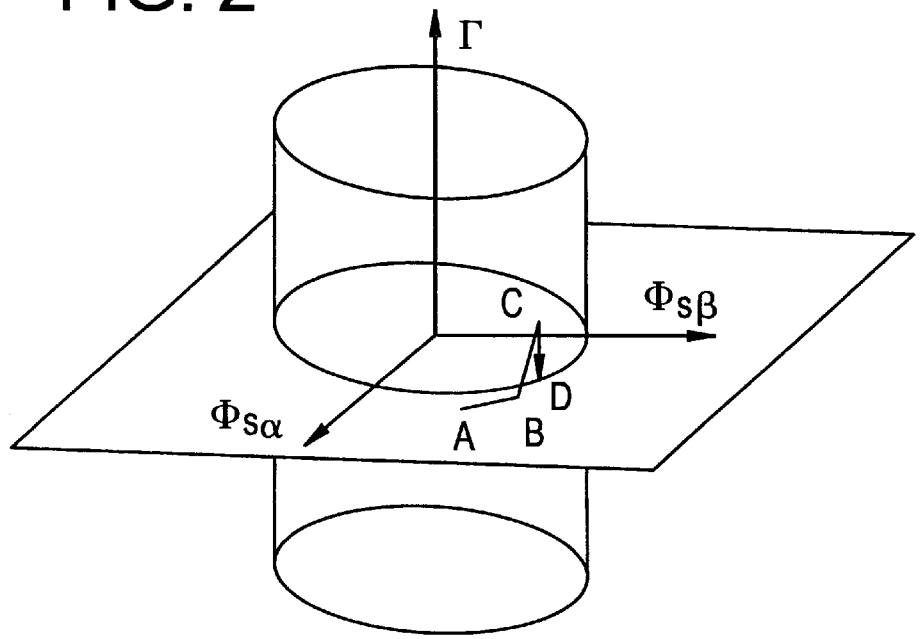
FIG. 2 is a diagram in the working space used in the context of the invention.
Figure 3:
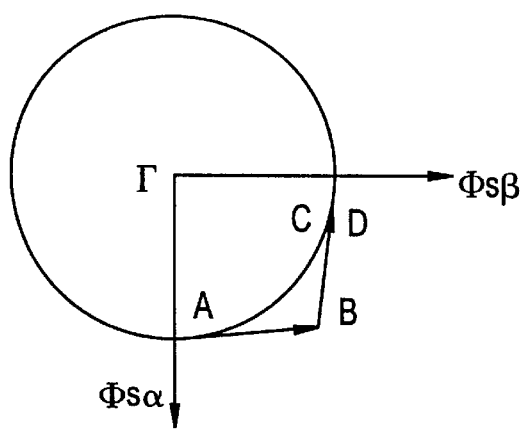
FIG. 3 is a diagram in the working plane having the axes $\Phi_{S\alpha}$, $\Phi_{S\beta}$, of a sequence of commands designed to join the reference circle ($|\Phi_S|_{ref}$, $\Gamma_{ref}$).

The working space taken into account is again the ($\Phi_{S\alpha}$, $\Phi_{S\beta}$, $\Gamma$) frame of reference shown diagrammatically in FIG. 2. It is predetermined that each optimum command sequence is constituted by a triplet of commands, with the commands following one another at a period DTML which is equal to $1/(2f_d)$, i.e. to half the switching period of the inverter. In the present case, the sampling period is selected to be equal to the period DTML for measurement purposes.

In accordance with the invention, the method provides for the computer to select only two the $m^n$ output voltage vectors $V_S$ that can be generated by the inverter 2 when performing calculations relating to determining times for an optimum sequence constituted by a command triplet. This simplification of the calculation is made possible by shifting the point taken as the origin during the calculation for each sequence, in the manner shown in FIG. 6.

Figure 4:
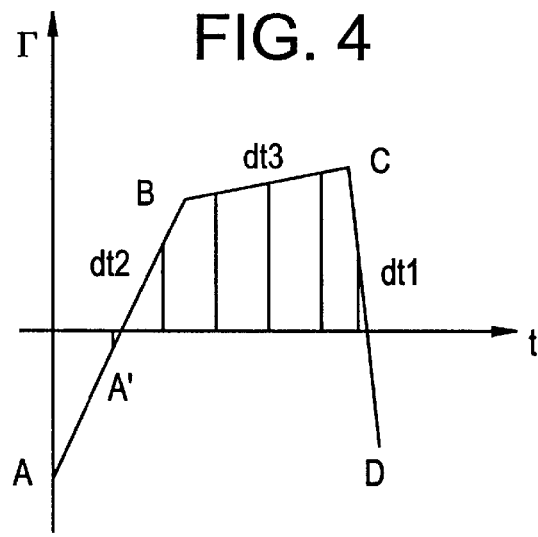
FIG. 4 is a diagram showing torque as a function of time and showing the stages of a command sequence.

In the example of a previously implemented optimum sequence that is shown in FIG. 4, the origin used for calculating an optimum sequence is the origin A of the vector AB. It corresponds to the switching instant in the inverter which leads to the output voltage $V_S$ corresponding to said vector AB being applied to the stator of the servo-controlled machine.

In accordance with the invention, the origin point is shifted when performing calculations relating to an optimum sequence so as to have only two vectors that need to be taken into account per DTML period. This offset conserves an optimum sequence constituted by a command triplet made up of two active commands and one passive command. Each of the successive DTML sampling periods begins at the instant of transition between two successive active commands, i.e. two commands that thus belong to two successive sequences. By way of example, this instant corresponds to transition point B between the vector AB and the vector BC, or transition pint E between successive vectors DE and EF that are respectively situated one in the sampling period defined by instants nDTML and (n+1) DTML and the other in the following period.

In accordance with the invention, provision is made to calculate the durations $t_p$ and $t_a$ corresponding to the respective times during which the passive vector and the two active vectors implemented in any one period are applied. This calculation makes it possible to determine respective torque variations $d\Gamma/dt_a$ and $d\Gamma/dt_p$ associated with the active vector and with the passive vector.

Using the notation $d\Gamma/dt_a$ to represent variation over time in the torque when an active vector $V_a$ is applied, $d\Gamma/dt_p$ to represent the variation over time in the torque when a passive vector $V_p$ is applied, $\Gamma_{ref}$ for the reference torque, and $\Gamma_n$ for the present torque, it is possible to calculate the values of $t_a$ and $t_p$ from the following system of equations:

$$\begin{cases} \dfrac{d\Gamma}{dt_a}t_a + \dfrac{d\Gamma}{dt_p}t_p = \Gamma_{ref} - \Gamma_n \\ t_a + t_p = DTML \end{cases}$$

Figure 1:
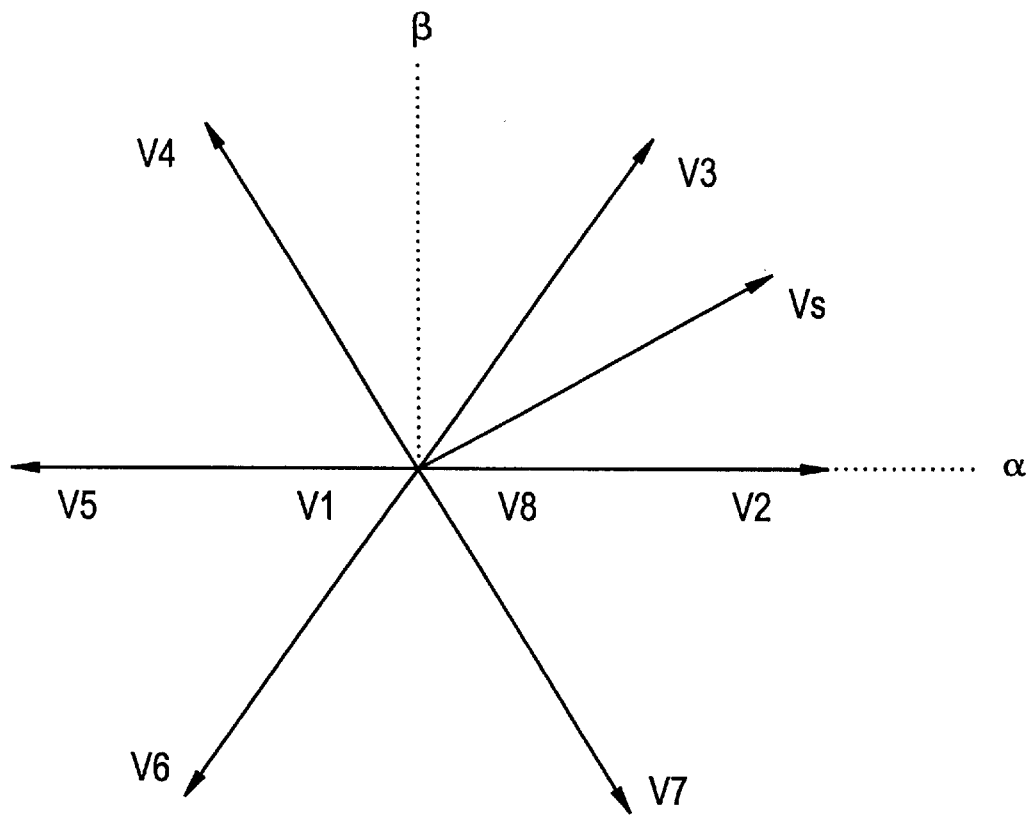
FIG. 1 is an instantaneous vector representation of various voltages supplied to the stator of a rotary machine by an inverter having three switches with two logic levels each.

Provision is made to select the active vector which corresponds to minimizing flux error amongst the potential active vectors which are adjacent to the most recently used active vector, in the ($\alpha$, $\beta$) frame of reference shown diagrammatically in FIG. 1.

It is also possible to select as the active vector the vector which minimizes undulations in torque at any determined switching frequency.

Figure 6:
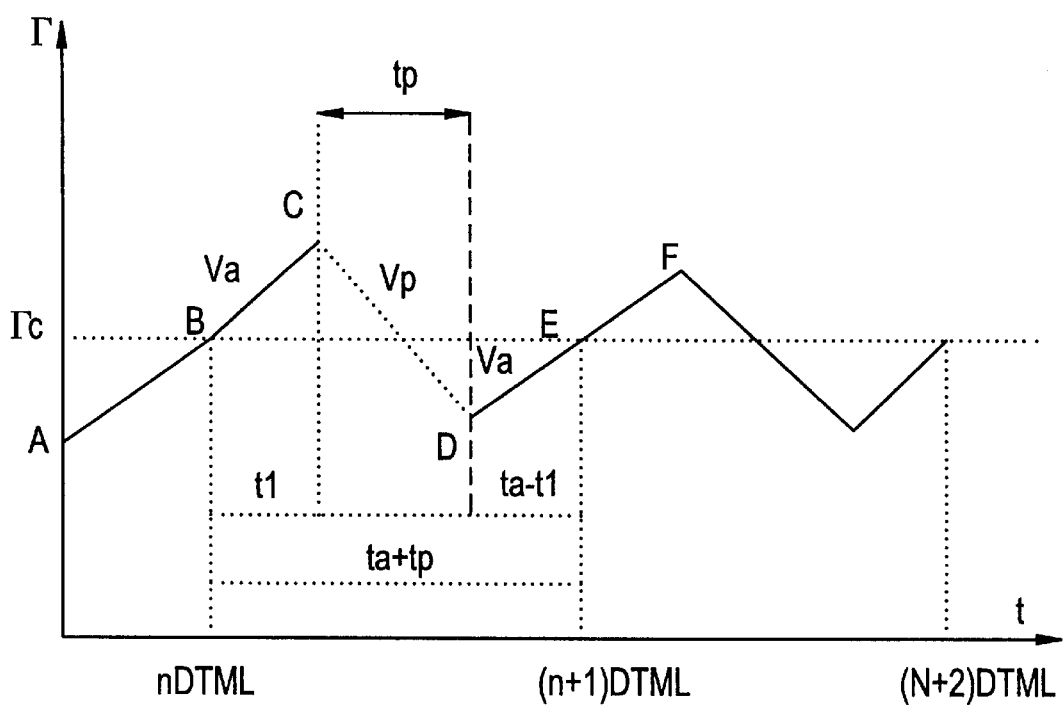
FIG. 6 is a diagram of torque as a function of time showing a run of command sequences in accordance with the invention.

If the resulting regulation were mathematically exact, then $\Gamma_{ref}$ would always be equal to $\Gamma_n$ and the subdivision of the active vector into two portions would always lead to a distribution that is symmetrical. However, in practice, the present torque $\Gamma_n$ is not equal to the reference torque $\Gamma_{ref}$ so the distribution between the vectors of a command triplet is ($V_a$, $t_1$), ($V_p$, $t_p$), and ($V_a$, ($t_a-t_1$)), as shown in FIG. 6.

Torque can be adjusted by acting on the duration $t_1$ in the availability range corresponding to the total active duration $t_a$ as shared between the two active vectors of a given triplet.

This time sharing is defined by the following equation:

$$t_1 = \frac{2(\Gamma_{ref} - \Gamma_n)DTML - t_a^2(d\Gamma/dt_a) - t_p(d\Gamma/dt_p)DTML}{2(d\Gamma/dt_a) - (d\Gamma/dt_p)t_p}$$

The command sequence ($V_a$, $t_1$), ($V_p$, $t_p$), ($V_a$, ($t_a-t_1$)) ensures that the mean torque is set to the reference value and that the final torque is set to the reference value with stator flux error being minimized.

What is claimed is:

1. A method of controlling the electromagnetic torque of a rotary machine having n phases powered via an inverter having n switches each having m states, thereby defining $m^n$ states for a stator voltage vector $V_i$, where $i \in \{1, \ldots, m^n\}$, the machine being servo-controlled in terms of electromagnetic torque $\Gamma$ and stator flux $\Phi_S$ to a reference electromagnetic torque $\Gamma_{ref}$ and a reference stator flux $\Phi_{Sref}$ by means of a servo-control system comprising a set of sensors, an observer, and a computer, the computer delivering control signals to the multi-state switches of the inverter in successive sequences of three successive commands, on the basis of values supplied to the observer by the sensors, the computer determining for each sequence, amongst the $V_i$ possible states of the stator voltage vector, the three command vectors to be used in succession so as to bring the torque $\Gamma$ and the stator flux $\Phi_S$ optimally towards the reference torque $\Gamma_{ref}$ and the reference flux $\Phi_{Sref}$ and to command the multi-state switches accordingly, wherein, in a system where the sampling period for measuring purposes is selected to be equal to a period DTML specific to the sequences of three successive commands, which period is itself equal to half the switching period of the inverter, the instants and the durations for which the vectors of each sequence are obtained by solving the following system of equations:

$$\begin{cases} \frac{d\Gamma}{dt_a}t_a + \frac{d\Gamma}{dt_p}t_p = \Gamma_{ref} - \Gamma_n \\ t_a + t_p = DTML \end{cases}$$

in which: $d\Gamma/dt_a$ corresponds to variation in time of the torque while an active vector $V_a$ is being applied; $d\Gamma/dt_p$ corresponds to variation in time of the torque while a passive vector $V_p$ is being applied; $\Gamma_{ref}$ is the reference torque; $\Gamma_n$ is the present torque, and $t_a$ and $t_p$ are the times during which the active and passive vectors are respectively applied.

2. A method according to claim 1, in which the time during which the active vector is applied for a sequence is shared on either side of the time during which the passive vector is applied, in accordance with the following equation:

$$t_1 = \frac{2(\Gamma_{ref} - \Gamma_n)DTML - t_a^2(d\Gamma/dt_a) - t_p(d\Gamma/dt_p)DTML}{2(d\Gamma/dt_a) - (d\Gamma/dt_p)t_p}.$$

3. A servo-control system for a rotary machine having n phases which is powered by an inverter having n switches each having m states, thereby defining $m^n$ states for a stator voltage vector $V_i$, where $i \in \{1, \ldots, m^n\}$, the machine being servo-controlled in terms of electromagnetic torque $\Gamma$ and stator flux $\Phi_S$ to a reference electromagnetic torque $\Gamma_{ref}$ and a reference stator flux $\Phi_{Sref}$ by means of a servo-control system comprising a set of sensors, an observer, and a computer, the computer delivering control signals to the multi-state switches of the inverter in successive sequences of three successive commands, on the basis of values supplied to the observer by the sensors, the computer determining for each sequence, amongst the $V_i$ possible states of the stator voltage vector, the three command vectors to be used in succession so as to bring the torque $\Gamma$ and the stator flux $\Phi_S$ optimally towards the reference torque $\Gamma_{ref}$ and the reference flux $\Phi_{Sref}$ and to command the multi-state switches accordingly, the system implementing the method according to claim 1.

4. An n-phase rotary machine powered via an inverter having n switches each having m states, thereby defining $m^n$ states for a stator voltage vector $V_i$, where $i \in \{1, \ldots, m^n\}$, the machine being servo-controlled in terms of electromagnetic torque $\Gamma$ and stator flux $\Phi_S$ to a reference electromagnetic torque $\Gamma_{ref}$ and a reference stator flux $\Phi_{Sref}$ by means of a servo-control system comprising a set of sensors, an observer, and a computer, the computer delivering control signals to the multi-state switches of the inverter in successive sequences of three successive commands, on the basis of values supplied to the observer by the sensors, the computer determining for each sequence, amongst the $V_i$ possible states of the stator voltage vector, the three command vectors to be used in succession so as to bring the torque $\Gamma$ and the stator flux $\Phi_S$ optimally towards the reference torque $\Gamma_{ref}$ and the reference flux $\Phi_{Sref}$ and to command the multi-state switches accordingly, the machine being fitted with a servo-control system implementing the method according to claim 1.

\* \* \* \* \*